United States Patent
Kolstad et al.

(10) Patent No.: US 10,072,119 B2
(45) Date of Patent: Sep. 11, 2018

(54) PROCESS FOR ENHANCING THE MOLECULAR WEIGHT OF A POLYESTER

(71) Applicant: Furanix Technologies B.V., Amsterdam (NL)

(72) Inventors: Jeffrey John Kolstad, Amsterdam (NL); Gerardus Johannes Maria Gruter, Amsterdam (NL); Matheus Adrianus Dam, Amsterdam (NL); Jesper Gabriël van Berkel, Amsterdam (NL); Robert Joseph Schiavone, Matthews, NC (US); Marion L. Andrews, Darlington, SC (US)

(73) Assignee: Synvina C.V., Amsterdam (NL)

( * ) Notice: Subject to any disclaimer, the term of this patent is extended or adjusted under 35 U.S.C. 154(b) by 0 days.

(21) Appl. No.: 15/123,804

(22) PCT Filed: Mar. 11, 2015

(86) PCT No.: PCT/NL2015/050153
§ 371 (c)(1),
(2) Date: Sep. 6, 2016

(87) PCT Pub. No.: WO2015/137806
PCT Pub. Date: Sep. 17, 2015

(65) Prior Publication Data
US 2017/0015781 A1   Jan. 19, 2017

Related U.S. Application Data

(60) Provisional application No. 61/951,229, filed on Mar. 11, 2014.

(30) Foreign Application Priority Data

Mar. 11, 2014   (NL) ..................... 2012408

(51) Int. Cl.
C08G 63/88 (2006.01)
C08G 63/181 (2006.01)
C08G 63/80 (2006.01)
C08G 63/16 (2006.01)
C08G 63/86 (2006.01)

(52) U.S. Cl.
CPC ............. *C08G 63/88* (2013.01); *C08G 63/16* (2013.01); *C08G 63/181* (2013.01); *C08G 63/80* (2013.01); *C08G 63/866* (2013.01)

(58) Field of Classification Search
CPC ...... C08G 63/88; C08G 63/866; C08G 63/16; C08G 63/181; C08G 63/80
See application file for complete search history.

(56) References Cited

U.S. PATENT DOCUMENTS

| | | | |
|---|---|---|---|
| 2,551,731 A | 5/1951 | Drewitt | |
| 4,340,721 A | 7/1982 | Bonnebat et al. | |
| 5,362,844 A * | 11/1994 | Kerpes | B65D 65/38 264/5 |
| 6,569,479 B2 | 5/2003 | Rule | |
| 2009/0124763 A1 | 5/2009 | Matsuda et al. | |
| 2011/0282020 A1* | 11/2011 | Sipos | C08G 63/181 526/190 |
| 2014/0357808 A1 | 12/2014 | Hess et al. | |
| 2015/0353692 A1* | 12/2015 | Bhattacharjee | B32B 27/32 428/457 |

FOREIGN PATENT DOCUMENTS

| | | |
|---|---|---|
| CN | 104136485 A | 11/2014 |
| KR | 20140003167 A | 1/2014 |
| WO | 2010/077133 A1 | 7/2010 |
| WO | 2010/132740 A2 | 11/2010 |
| WO | 2011/043660 A2 | 4/2011 |
| WO | 2011/043661 A1 | 4/2011 |
| WO | 2013/062408 A1 | 5/2013 |
| WO | 2013/120989 A2 | 8/2013 |

OTHER PUBLICATIONS

Papageorgiou, G.Z., et al.; Physical Chemistry: Chemical Physics, 2014, vol. 16, p. 7946-7958.*
Chinese Office Action for corresponding Chinese Patent Application No. 201580022558.2, dated Nov. 28, 2017 (6 pages).

* cited by examiner

Primary Examiner — Robert S Jones, Jr.
(74) Attorney, Agent, or Firm — Hoffmann & Baron, LLP

(57) ABSTRACT

The molecular weight of a semi-crystalline starting polyester comprising ethylene 2,5-furandicarboxylate units is enhanced by heating the semi-crystalline starting polyester, having a melting point Tm, at a temperature in the range of (Tm-40° C.) to Tm to obtain a solid stated polyester, where the semi-crystalline starting polyester has an intrinsic viscosity of at least 0.45 dL/g, and an amount of carboxylic acid end groups in the range of 15 to 122 meq/kg.

20 Claims, No Drawings

PROCESS FOR ENHANCING THE MOLECULAR WEIGHT OF A POLYESTER

CROSS-REFERENCE TO RELATED APPLICATIONS

This application is the National Stage of International Application No. PCT/NL2015/050153 filed Mar. 11, 2015, which claims the benefit of Netherlands Application No. NL 2012408, filed Mar. 11, 2014, and claims the benefit of U.S. Provisional Application No. 61/951,229, filed Mar. 11, 2014, the contents of all of which are incorporated by reference herein.

FIELD OF THE INVENTION

The present invention relates to a process for enhancing the molecular weight of a polyester. In particular, it relates to a process for enhancing the molecular weight of a semi-crystalline starting polyester comprising ethylene-2,5-furandicarboxylate units.

BACKGROUND OF THE INVENTION 2,5-Furandicarboxylic acid (FDCA) is a diacid that can be produced from natural sources such as carbohydrates. Routes for its preparation using air oxidation of 2,5-disubstituted furans such as 5-hydroxymethylfurfural or ethers thereof with catalysts comprising Co and Mn have been disclosed in e.g. WO2010/132740, WO2011/043660 and WO2011/043661.

U.S. Pat. No. 2,551,731 describes the preparation of polyesters and polyester-amides by reacting glycols with dicarboxylic acids of which at least one contains a heterocyclic ring, such as 2,5-FDCA. Under melt polymerization conditions, using sodium- and magnesium methoxide as a catalyst, FDCA or FDCA dimethyl ester and 1.6 equivalents of ethylene glycol were reacted in a esterification step or transesterification step, respectively, at ambient pressure between 160 and 220° C., after which a polycondensation was carried out between 190 and 220° C. under a few mm Hg pressure. The product had a reported melting point of 205-210° C. and readily yielded filaments from the melt.

In US 2009/0124763 polyesters are described, having a 2,5-furandicarboxylate moiety within the polymer backbone and having a degree of polymerization of 185 or more and 600 or less. These polymers are made in a three step process involving the esterification of the 2,5-FDCA or the transesterification of the diester thereof with a diol, and a second step involving polycondensation, followed by solid state polymerization as third step.

The first step is carried out at ambient pressure at a temperature within a range of 150 to 180° C., whereas the polycondensation step is carried out under vacuum at a temperature within a range of 180 to 230° C. The product is then purified by dissolving the same in hexafluoroisopropanol, re-precipitation and drying, followed by the third step, a solid state polymerization at a temperature in the range of from 140 to 180° C. For the preparation of poly(ethylene furandicarboxylate) the first two steps took over 11 hours. The polymer is reported to have a melting point of 170° C. In examples it is shown that despite the step of solid state polymerization, the molecular weight of e.g. poly(ethylene-2,5-furandicarboxylate) is still rather low.

In WO 2010/077133 a process for preparing furandicarboxylate-containing polyesters is described wherein the diester of FDCA is transesterified with a diol, and the ester composition thus obtained is subjected to polycondensation. The polycondensate may then be subjected to solid state polymerization. In an example the solid state polymerization is conducted for 60 hours. Although the molecular weight of the polyester obtained is reasonably high, the duration of the solid state polymerization is considered too long. An improvement is described in WO 2013/062408, wherein the dimethyl ester of FDCA is transesterified with ethylene glycol, or bis(2-hydroxyethyl)-2,5-furandicarboxylate is used as starting material. The transesterification product or this starting material is then subjected to polycondensation and after a drying/crystallization step the polycondensate is subjected to solid state polymerization to enhance the molecular weight of the polycondensate. In an example the polycondensate was ground and sieved and the fraction with particle size 0.6-1.4 mm was crystallized overnight at 110° C. overnight. This fraction was subjected to solid state polymerization which took two days.

In WO 2013/120989 a continuous process for the preparation of poly(ethylene furandicarboxylate) is described wherein FDCA or a diester thereof is mixed with ethylene glycol at elevated temperature to give a paste or a homogeneous solution, the paste or solution is converted to an esterification product of FDCA and ethylene glycol, the esterification product is polycondensed under reduced pressure, wherein the polycondensation is performed in two stages. According to an example the dimethyl ester of FDCA was reacted with ethylene glycol in a molar ratio of 1:1.7. In this example the stages following the production of the esterified product took 5 hours. The polycondensation product can be subjected, if desired, to a solid stating polymerization. However, no details are provided. In an example the polycondensation product was reported to have an intrinsic viscosity of 1.05 dL/g.

KR 20140003167 describes a polyester polymer with excellent transparency which is manufactured by using a biomass originated furandicarboxylate ester compound with ethylene glycol. In comparative examples also furandicarboxylic acid has been used. The molar ratio of furandicarboxylate ester to ethylene glycol may be from 1:1.1 to 1:4. The ratio of furandicarboxylic acid to ethylene glycol varies between 1:1.2 to 1:2. The document does not disclose a solid state polymerization step.

It is apparent that it would be beneficial if the process could be altered such that a faster enhancement of the molecular weight of such polyesters could be obtained. It has now surprisingly been found that when a semi-crystalline polyester having a particular structure is subjected to solid-state polymerization, the solid state polymerization proceeds faster than as reported in the above-mentioned patent specifications.

SUMMARY OF THE INVENTION

Accordingly, the present invention provides a process for enhancing the molecular weight of a semi-crystalline starting polyester comprising ethylene 2,5-furandicarboxylate units by heating the semi-crystalline starting polyester, having a melting point Tm, at a temperature in the range of (Tm-40° C.) to Tm to obtain a solid stated polyester, wherein the semi-crystalline starting polyester has an intrinsic viscosity of at least 0.45 dl/g, and an amount of carboxylic acid end groups in the range of 15 to 122 meq/kg. Preferably, the semi-crystalline starting polyester has an intrinsic viscosity of at most 1.0 dL/g.

DETAILED DESCRIPTION OF THE INVENTION

The starting polyester is semi crystalline. The crystallinity of a polymer tends to affect its physical properties, such as its density and melting temperature. Polymer crystallinity can be determined with Differential Scanning Calorimetry (DSC) by quantifying the heat associated with melting of the polymer. The heat can be reported as the percentage of crystallinity by normalizing the melting heat to that of a 100% crystalline sample. However, those samples are rare. Therefore, the crystallinity is often expressed as net enthalpy in terms of number of Joules per gram which number is derived from the DSC technique. The enthalpy of melting and crystallization can be determined in accordance with ISO 11357-3. The semi-crystalline starting polyester preferably has a crystallinity of at least 25 J/g, measured by DSC. A maximum enthalpy in terms of number of Joules per gram is typically 80 J/g. The semi-crystalline starting polyester having a certain degree of crystallinity then also has a melting point Tm. The melting point of a polymer is easily determined by DSC and measured at the top of the endothermic peak. The ISO11357-3 standard describes such a melting point determination. In accordance with this determination, the starting polyester suitably has a Tm of at least 200° C. In highly crystalline polyester the Tm may exceed 230° C. and may be as high as 245° C. It is observed that during the present process the melting point and crystallinity of the polyester will increase. The melting point of the starting polyester is preferably at least 210° C. and may increase during the process such that at the end thereof it may exceed 220° C. The crystallinity will then preferably be greater than 40 J/g. The crystallinity will then advantageously be in the range of 40 to 90 J/g.

The semi-crystalline starting polyester suitably consists of ethylene furandicarboxylate units for at least 95 mole %. The balance may comprise other monomer units, such as other diols and diacids. Other suitable monomer diols include diethylene glycol and other suitable diacids, include terephthalic acid, adipic acid, phthalic acid and isophthalic acid. More preferably, the polyester consists of poly(ethylene 2,5-furandicarboxylate) that further comprises diethylene glycol residues, wherein the amount of diethylene glycol residues amounts to at most 0.045 moles of diethylene glycol residues per mole of 2,5-furandicarboxylate.

The starting polyester is typically the product of the esterification of FDCA and ethylene glycol, followed by a polycondensation step. The polycondensation step generally is conducted under melt conditions. In accordance with the teaching of WO 2013/120989 the polycondensation may be carried out in two steps; a pre-polycondensation at reduced pressure and a subsequent polycondensation at a further reduced vacuum. The resulting polycondensate can be subjected to the solid state polymerization according to the present invention. Such a polycondensate already has a certain relatively high molecular weight. If the polycondensate has an initial IV already greater than 1.0 dL/g, the principal purpose of such an additional step of solid state polymerization may be to achieve a reduction in volatiles, such as acetaldehyde, which can form during the melt polycondensation in addition to an additional molecular weight increase.

The molecular weight is expressed in terms of intrinsic viscosity. First the is relative viscosity ($\eta_{rel}$) is determined in a 60/40 w/w mixture of phenol and tetrachloroethane at 30° C. and a concentration (c) of 0.4 g/dL. This procedure is similar to the ASTM D4603 standard for the determination of the inherent viscosity for poly(ethylene terephthalate). The intrinsic viscosity is then calculated using the Billmyer equation:

$$\text{Intrinsic viscosity (IV)} = \{\eta_{rel} - 1 + 3 * \ln(\eta_{rel})\}/(4*c)$$

The intrinsic viscosity is suitably greater than 0.45 dL/g and more preferably in the range of 0.45 to 1.0 dL/g. As the starting polyester is to undergo an additional step of solid stating the molecular weight is preferably in the range of 0.45 to 0.75 dL/g. Due to solid stating the molecular weight is increased such as to 0.65 to 1.2 dL/g, preferably to an intrinsic viscosity of at least 0.75 dL/g, more preferably in the range of 0.75 dL/g to 1.0 dL/g.

Acetaldehyde may be formed during the melt polycondensation. Its content in polyesters can be determined using known methods. A suitable method is described in ASTM F 2013; this is described for polyethylene terephthalate, but can also be used for the polyester used in the present invention. Applicants have found that polycondensates can have acetaldehyde values of 18 mg/kg, or higher, prior to the additional steps of solid state polymerization as described herein. Applicants have also found that the solid state polymerization process described herein can reduce the levels of acetaldehyde to less than 1 mg/kg (ppm) and preferably to less than 0.5 mg/kg within a reasonably short reaction time.

As is taught in U.S. Pat. No. 6,569,479 acetaldehyde is naturally formed during processing of any polyester containing ethylene glycol linkages. The compound is formed via a two-step reaction: the first step is cleavage of a polymer chain, generating a vinyl end group and a carboxylic acid end group. The second step is reaction of the vinyl end group with a hydroxyethyl end group, reforming the polymer chain and releasing acetaldehyde. When the polymer is used in a container for beverages, the acetaldehyde may migrate from the container sidewall into the beverage over time. During the lifetime of a typical container, several hundred ppb of acetaldehyde can migrate from the container sidewall into the beverage. For sensitive products, such as water, these levels of acetaldehyde are significantly above the taste threshold. In U.S. Pat. No. 4,340,721 it is shown that when polyethylene terephthalate contains more than 1 ppm acetaldehyde, the polymer is unsuitable for use as material for beverage containers. Therefore there is a great desire to limit the amount of acetaldehyde in polyesters comprising ethylene furandicarboxylate units also to a level below 1 ppm (mg acetaldehyde per kg polyester).

The polycondensate can be used as such. However, it is preferred to subject it to a pre-treatment before it is being heated to obtain the solid stated polyester. When the polycondensate is recovered as solid material from the polycondensation step, the polycondensate tends to be rather amorphous and only semi-crystalline to a certain extent. In order to render the polycondensate into a more crystalline material, the polycondensate is preferably crystallized at a temperature in the range of 90 to 200° C., more preferably from 140 to 180° C. In certain arrangements the heating step may entail controlling the temperature of the pellet during pelletization such that the final pellet temperature is in a range where crystallization occurs. Prior to any step of additional heating any adhered water from the pelletizing step is suitably removed. This procedure is suitably carried out by cooling, i.e., bringing the temperature of the polycondensate to the desired temperature in the range of 90 to 200° C. This cooling may be done by means of a liquid, e.g. water. For poly(ethylene 2,5-furandicarboxylate) it has been found that the most rapid crystallization occurs at approximately 170°

C. It has also been found that if the particles are held for approximately 1 hour at 120° C. the subsequent crystallization at 170° C. is faster. The optimal temperature program will depend on the particular arrangements used for the crystallization. Typically, the polycondensate is kept a temperature in the range of 80 to 140° C. for a period of 0.2 to 3 hrs, preferably 0.5 to 2.5 hrs, followed by a crystallization step for 1 to 48 hours at a temperature in the range of 120 to 200° C. It has been found that the polyester chains in the polycondensate crystallize under these conditions yielding a desired semi-crystalline polyester. It has also been found that it can be advantageous to use a degree of agitation during the pre-treatment and crystallization period, to reduce the propensity of the particles to adhere to each other and cause clumping. Also, it has been found that a thermal pretreatment in water at 80 to 95° C. can also reduce the tendency of particles to adhere to each other during the subsequent crystallization in the range of 120 to 200° C. Accordingly, there are several advantageous protocols to arrive at the desired crystallinity, all being completed by a crystallizing heating step at 120 to 200° C. One alternative is to subject the polycondensate to a heating step at 80 to 140° C. for a period of 0.2 to 3 hrs, followed by the crystallizing heating step. A second alternative is to conduct such heating step at 80 to 140° C. in a liquid, e.g. water. The melted polycondensate may also be pelletized while crystallizing by using e.g. an underwater pelletizer.

It has been found that the polyester chains in the polycondensate crystallize under these conditions yielding a semi-crystalline polyester. The polyester thus obtained suitably has a crystallinity of at least 25 J/g, measured by DSC. It suitably has a melting point of at least 200° C., preferably at least 215° C.

The semi-crystalline starting polyester has an amount of carboxylic acid end groups. In accordance with the present invention the semi-crystalline starting polyester should have an amount of carboxylic end groups of 15 to 122 meq/kg. The amount of carboxylic end groups is preferably in the range of 25 to 80 meq/kg. In addition the starting polyester also comprises hydroxyl end groups. The amount of hydroxyl end groups may vary widely. Preferably, the amount of hydroxyl end groups is in the range of 25 to 100 meq/kg.

In this context it is observed that during polycondensation some carboxylic groups may be split from the furan ring to which they were attached, leading to decarboxylated end groups.

In general there are a number of methods to determine the end groups in polyesters. Such methods include titration, infrared and nuclear magnetic resonance (NMR) methods. Often the separate methods are used to quantify the four main end groups: carboxylic acid end groups, hydroxyl end groups, methyl ester end groups and the end groups that are obtained after decarboxylation. However, in A. T. Jackson and D. F. Robertson have published an $^1$H-NMR method for end group determination in "Molecular Characterization and Analysis of Polymers" (J. M. Chalmers en R. J. Meier (eds.), Vol. 53 of "Comprehensive Analytical Chemistry", by B. Barcelo (ed.), (2008) Elsevier, on pages 171-203. In this method the hydroxyl end group is determined in polyethylene terephthalate (PET) by using a selection of harsh solvents such as 3-chlorophenol, 1,1,1,3,3,3-hexafluoro-2-propanol, trichloroacetic acid or trifluoroacetic acid. It is preferred to use deuterated 1,1,2,2-tetrachloroethane (TCE-d2) as solvent without any derivatization of the polyester. A similar method can be carried out for polyesters that comprises furandicarboxylate moieties and ethylene glycol residues. The measurement of the end groups for the latter polyesters can be performed at room temperature without an undue risk of precipitation of the polyester from the solution. This $^1$H-NMR method using TCE-d2 is very suitable to determine the hydroxyl end groups (HEG), the decarboxylation and the content of diethylene glycol (DEG) groups. Peak assignments are set using the TCE peak at a chemical shift of 6.04 ppm. The furan peak at a chemical shift of 7.28 ppm is integrated and the integral is set at 2.000 for the two protons on the furan ring. The HEG is determined from the two methylene protons of the hydroxyl end group at 4.0 ppm. The content of DEG is determined from the integral of the shifts at 3.82 to 3.92 ppm, representing four protons. The decarboxylated end groups are found at a shift of 7.64-7.67 ppm, representing one proton. When the polyester also comprises methyl ester end groups, the methyl signal will occur at 3.97 ppm, representing 3 protons.

The carboxylic acid end groups are determined by using the titration method according to ASTM D7409, adapted for poly(ethylene 2,5-furandicarboxylate). A thus modified method thereof involves the titration of a 4% w/v solution of poly(ethylene 2,5-furandicarboxylate) in ortho-cresol with 0.01M KOH in ethanol as titrant to its equivalence point, using 0.5 mg of bromocresol green (2,6-dibromo-4-[7-(3,5-dibromo-4-hydroxy-2-methylphenyl)-9,9-dioxo-8-oxa-9λ6-thiabicyclo[4.3.0]nona-1,3,5-trien-7-yl]-3-methyl-phenol) in 0.1 ml ethanol as indicator.

For the purpose of the present application the values for HEG and the decarboxylated end groups are obtained by $^1$H-NMR using TCE-d2, whereas the values for CEG are determined by the titration method described above.

The content of the various end groups can be expressed as relative to other end groups. It is also possible to express the amount of end groups as an absolute value per weight unit of polyester. Expressed as an absolute feature, the amount of carboxylic acid end groups in the semi-crystalline starting polyester is advantageously in the range of 25 to 80 meq/kg. The calculation of the absolute amount of carboxylic acid end groups is obtained directly from the titration.

About 10 mg of a polyester is weighed and put in an 8 mL glass vial. To the vial 0.7 mL of TCE-d2 is added and the polyester is dissolved at room temperature whilst agitating the mixture in the vial. The dissolved mixture is subjected to $^1$H-NMR, whilst the peak for TCE-d2 is set at 6.04 ppm. The furan peak is centered at 7.28 ppm, and it is integrated and the integral set to 2.000, to represent the 2 protons on the furan ring. The $^1$H-NMR signals are integrated and the amounts of end groups are calculated as follows:

Hydroxyl end groups (HEG)=5494*integral at 4.0 ppm/2;

Decarboxylated end groups (DecarbEG)=5494*integral at 7.65 ppm.

When the polyester also comprises methyl ester end groups, the methyl signal will occur at 3.97 ppm and the content of the ester end groups is then calculated as:

Ester end groups (EEG)=5494*integral at 3.97 ppm/3.

The results of these calculations are amounts of the respective end groups expressed in meq/kg. It is also possible to calculate a relative content of carboxylic acid end groups based on the sum of the carboxylic acid end groups and hydroxyl end groups. For that purpose, the following formula is used:

CEG/(CEG+HEG).

The semi-crystalline starting polyester having an amount of hydroxyl end groups in addition to carboxylic acid end groups, preferably has a content of carboxylic acid end groups, expressed as the fraction of the molar amount of carboxylic acid end groups divided by the sum of the molar amounts of hydroxyl end groups and carboxylic acid end groups, in the range of 0.10 to 0.7. More preferably, the relative content of carboxylic acid end groups is in the range of 0.14 to 0.65 based on the sum of the hydroxyl and carboxylic acid end groups.

It may be advantageous to have a reduced level of carboxylic acid end groups in the final product after solid state polymerization. Applicants have found that while a high level of CEG is desired to achieve a high rate and extent of solid state polymerization, it may be desired to have a lower level in the solid stated polyester. Thus, in preferred embodiments, the amount of CEG of the solid stated polyester is less than 30 meq/kg and more preferably less than 20 meq/kg. Suitably the amount of CEG is in the range of 5 to 30 meq/kg, more preferably in the range of 7 to 20 meq/kg. It is also advantageous to have relatively few decarboxylated end groups, and in preferred embodiments the decarboxylated end group content is less than 15 meq/kg.

As indicated above, the process of the present invention also enables the obtaining of a solid stated polyester that has a reduced acetaldehyde content. At the same time, the molecular weight has been enhanced. Preferably, the enhancement has led to a molecular weight corresponding to an intrinsic viscosity of at least 0.75 dL/g. Such a polyester is novel. Such a polyester also fulfils a long-felt desire. Accordingly, the present invention provides for a polyester comprising ethylene-2,5-furandicarboxylate units, which polyester has an IV of at least 0.75 dl/g and an acetaldehyde content of at most 1 mg/kg, preferably less than 0.5 mg/kg. Suitably the polyester has an amount of carboxylic acid end groups below 30 meq/kg, preferably from 5 to 30, more preferably from 7 to 20 meq/kg.

During the solid state polymerization also the crystallinity increases. The solid stated polyesters according to the invention thus also have preferably a crystallinity of at least 50 J/g, measured by Differential Scanning Calorimetry (DSC). Preferably, the crystallinity is in the range of 55 to 90 J/g.

The semi-crystalline starting polyester is suitably prepared from a mixture of FDCA and ethylene glycol by esterification, followed by polycondensation, and optionally, by the heat treatment as described above. The esterification is preferably conducted from a starting mixture of FDCA and ethylene glycol, wherein the molar ratio of 2,5-furandicarboxylic acid to ethylene glycol is from 1:1.01 to 1:1.15.

The esterification reaction of furan dicarboxylic acid and ethylene glycol is known in the art. Hence, the skilled person will realize that although there is no need for using an esterification catalyst, the use of such a catalyst may be contemplated. Hence in an embodiment, the 2,5-furandicarboxyic acid and ethylene glycol are suitably reacted in the presence of an esterification catalyst. As esterification catalysts are advantageously acidic, and since one of the reactant is an acid, the necessity to use an esterification catalyst is lacking. However, when such a catalyst is used, it is suitably a Brønsted or Lewis acid. The Brønsted acids may be strong mineral acids such as sulphuric acid, nitric acid or hydrochloric acid. Suitable Lewis acids include compounds of metals such as the chlorides, bromides, tosylates, alkoxides and triflates of metal selected from the group consisting of titanium, tin, calcium, and mixtures thereof. It is also possible to use organic esters of the metal acids, such as the alkyl esters of titanic acid, stannic acid and the like. Hence, the esterification catalyst is preferably selected from catalysts containing one or more metals selected from the group consisting of titanium, zinc, tin, calcium and antimony. The catalysts, if used, may be added from the start of the esterification reaction. However, since the esterification proceeds easily without the use of an esterification catalyst, the esterification is preferably carried out in the absence of an esterification catalyst, which is dedicated to the esterification reaction.

In the esterification reaction water is being formed. It has been found that it is advantageous to remove the water formed during the reaction of 2,5-furandicarboxylic acid and ethylene glycol. In this way the esterification reaction being an equilibrium reaction, may be led to completion. The removal of water from the esterification mixture may be conducted in any known manner. It is suitable to pass any water formed in a vaporous phase through a condenser and remove the condensate that includes the liquefied water. The vaporous phase may comprise also some ethylene glycol. Therefore, the vaporous phase is advantageously passed through a distillation system wherein water and ethylene glycol are separated. The ethylene glycol is suitably, at least partly, but preferably substantially completely, recycled to the esterification mixture. The water thus separated is discharged. Hence, the method according to the present invention is preferably carried out such that water is removed in a rectification system wherein any ethylene glycol that is removed with water is separated from water and at least partly recycled.

It will be evident that the degree with which the ethylene glycol is entrained in the vaporous phase of water formed is dependent on the temperature and other conditions at which the esterification is carried out. The conditions that are used in the prior art include a temperature in the range of about 180 to 280° C. and about ambient pressure. These conditions were maintained for a period of about 4 hours. In the method according to the present invention the esterification reaction between 2,5-furandicarboxylic acid and alkylene diol is preferably carried out at a temperature of 160 to 240° C. The pressure is suitably in the range of 0.9 to 5 bar, and the reaction is advantageously continued for a period of 0.5 to 4 hr. The reaction is conveniently carried out in an inert atmosphere, such as under nitrogen, neon, helium or argon. The starting mixture may comprise a diluent, such as water that is suitably discharged during the reaction. As indicated in US 2009/0124763 the end point of the esterification reaction is confirmed by the time that the reaction mixture becomes transparent, i.e. the so-called clear point. Therefore, the esterification reaction in the present method is suitably pursued at least until the ester composition formed has become clear. If desired, the esterification reaction may be continued for a further period.

It has been found that the esterification reaction for 2,5-furandicarboxylic acid is quite fast and as a result it is most common to "over esterify" and leave an inadequate amount of carboxylic acid end groups in the polyester. The potential extent of the esterification reaction can be somewhat controlled by using a dimensionless parameter defined herein as:

Esterification Potential (EsPo)=(MR–1)$^2$*$P_{H2O}$(T), wherein MR represents the molar ratio of ethylene glycol over 2,5-furandicarboxylic acid, MR being greater than 1; $P_{H2O}$(T) represents the pure component vapor pressure (in bar) of water at temperature T, which is the final reaction temperature in the esterification mixture before the pressure is reduced to enter the pre-polycondensation stage. $P_{H2O}$ is determined in accordance with an established equation for the vapor pressure of pure water. The Antoine equation $$\log_{10} P = A - B/(C+T),$$

where T is the temperature at the end of esterification, expressed in ° C., A=5.2594, B=1810.94, and C=244.485 gives the required vapor pressure of pure water in bar. It has been found that the best results as to polycondensate are obtained if the esterification potential is at most 0.8, preferably from 0.05 to 0.5.

At this point the ester composition is subjected to a step of pre-polycondensation. Thereto, the pressure is reduced and, optionally, a polycondensation catalyst is added. The pre-polycondensation step is used to remove excess or unreacted ethylene glycol and to reduce the pressure to remove most of the other volatiles, while avoiding excessive foaming or carryover into the vacuum lines. The temperature is raised and the polycondensation reaction begins to occur, with liberation and removal of ethylene glycol which is generated via reaction. It is important to note that the esterification reaction also continues, generating water which is also removed from the reaction mixture. In very small batch equipment the same reactor may be used for all stages of the reaction. When the reaction is performed in larger scale batch equipment this stage may completed in the same equipment as the esterification reaction, and after this stage the reactant mixture may then be transferred to a vessel especially designed for good mass transfer to promote the polycondensation reaction. Alternatively, the reactant mixture may be moved to a different vessel prior to initiating the pressure let-down and the pre-polycondensation and the polycondensation are then conducted in a single vessel. The addition of polycondensation catalyst may already have occurred at the start of the esterification reaction, so that no further addition of the catalyst to the esterification product is desired at this point.

Other compounds, such as stabilizing agents, may also be added prior to the esterification or prior to the polycondensation. The stabilizing agents may include antioxidants. Preferable antioxidants are phosphite-containing compounds, phosphate compounds, phosphonate compounds, and hindered phenolic compounds. Antioxidants include such compounds as trialkyl phosphites, mixed alkyl/aryl phosphites, alkylated aryl phosphites, sterically hindered aryl phosphites, aliphatic spirocyclic phosphites, sterically hindered phenyl spirocyclics, sterically hindered bisphosphonites, alkyl phosphates, aryl phosphates, mixed alkyl/aryl phosphates, alkylphosphonoacetates, hydroxyphenyl propionates, hydroxy benzyls, alkyl phenols, aromatic amines, hindered amines, hydroquinones and mixtures thereof. Such other compounds may also be added in batch or any other type of operation. Hence compositions comprising the polyester according to the invention may comprise such compounds.

In a more continuous operation the pre-polycondensation reaction may be conducted in a dedicated vessel, typically with the overhead vapors being collected separately from the vapors generated during the esterification stage. During this process stage the pressure is typically reduced from approximately 1 bar or more used during esterification down to about 20 to 700 mbar, and more preferably to about 20 to 100 mbar. The duration of the pre-polycondensation is suitably in the range of 0.5 to 2 hours.

At this point the ester composition is subjected to a step of polycondensation. As is known from the prior art the pressure at this step is further reduced. Pressures of less than about 5 mbar and preferably less than about 3 mbar may be applied. Lower pressures are preferred for good mass transfer and removal of ethylene glycol and water being liberated in the polycondensation and esterification reactions, respectively. Polycondensation temperatures according to the prior art include about 180 to 280° C. The polycondensation according to the invention is preferably carried out at a temperature of 245 to 270° C. and suitably at a pressure of 0.05 to 5 mbar. Under these conditions it is ensured that the ester composition as well as the polycondensate formed is in a molten stage. The polycondensation is suitably continued for a period ranging from 1 to 3 hours. Preferably, the combined period for the pre-polycondensation and the polycondensation stages is in the range of 1.5 to 4 hours.

The polycondensation may be terminated when the desired intrinsic viscosity has been reached. This can be monitored by measuring the torque of a stirrer that is provided in the reactor wherein the polycondensation is being carried out. It can also be monitored, for example, by a melt viscometer at the outlet of the reactor in a continuous process arrangement. When the viscosity is sufficiently high, the polycondensation is stopped and the product is discharged, yielding the polycondensate.

As indicated above, the polycondensation is preferably carried out in the presence of a polycondensation catalyst. Many polycondensation catalysts may be used. Such catalysts include the catalysts comprising one or more elements selected from tin, zinc, titanium, antimony, calcium, manganese, cobalt, hafnium, lead, magnesium, aluminium, cerium, zirconium and mixtures thereof. These compounds may be the acetate or carbonate salts of these metals. Alternatively, metal alkoxides, alkyl metal compounds, or other organometallic compounds are also possible. Other suitable catalysts include the oxides and halides of the elements mentioned. Preferred catalysts include titanium alkoxides, antimony acetate, antimony oxide, and antimony glycolate, i.e. the reaction product of antimony oxide and ethylene glycol. The amounts of the polycondensation catalyst are typically in the range of 0.005 mol % to 0.2 mol %, based on the number of moles of 2,5-furandicarboxylic acid in the starting mixture, preferably in the range of 0.01 to 0.10 mol %.

The polycondensation catalysts may be added to the ester composition when the ester composition has been formed. It is also possible to add the polycondensation catalyst to the starting mixture of 2,5-furan dicarboxylic acid and ethylene glycol, optionally in the presence of an esterification catalyst. The esterification catalyst, if present, is suitably present in an amount of 0.005 mol % to 0.2 mol %, based on the number of moles of 2,5-furandicarboxylic acid in the starting mixture, preferably in the range of 0.02 to 0.15 mol %. When the polycondensation catalyst is added in the starting mixture the ester composition formed is suitably not isolated, but after forming of the ester composition, the resulting product is kept in the reaction zone where the esterification took place, and the product is used as such in the polycondensation step. Hence, the semi-crystalline starting polyester used in the process of the present invention preferably further comprises one or more esterification and/or polycondensation catalysts. The catalysts are suitably as described above, the esterification and/or polycondensation catalysts preferably having been selected from the esterification and polycondensation catalysts comprising a metal selected form the group consisting of titanium, tin, calcium, antimony, germanium, manganese, cobalt, lead, magnesium, aluminium, cerium, zirconium and hafnium.

When the temperature in the polycondensation step has been lowered to terminate the polycondensation, the polycondensate obtained will solidify. The polycondensate thus obtained is suitably subjected to the heat treatment as described above before it is used in the solid state polymerization at a temperature of (Tm-40° C.) to Tm.

Poly(ethylene 2,5-furandicarboxylate) is a slowly crystallizing polyester under quiescent conditions. Nucleating agents may be added to the polyester to increase the nucleation density, and thereby increase the overall crystallization rate under quiescent conditions.

For crystallization of the polyester used in the process according to the present invention, typically prior to an SSP process, crystallization may be conducted from the melt (as may be done in an underwater pelletizer with in-situ crystallization) or from the glassy state (after cooling of polymer granulates). To this end it may be desirable to add a nucleating agent to the polyester after the polycondensation, typically still in the melt phase. Typical addition levels will be from 0.05-2 wt %, or more preferably 0.1 to 1 wt %, based on the total polyester. The inorganic minerals may be added at higher levels, such as up to 5 or even 10 wt % if desired.

Nucleating agents may include inorganic minerals, organic salts, high melting waxes, or other polymers. Examples of inorganic minerals include talc, titanium dioxide, fused silica, boron nitride, mica, and calcium carbonate. Some examples of the organic salts sodium stearate, zinc stearate, other stearate salts, salts of other fatty acids, FDCA disodium salt, sodium salt of saccharine, salts of benzoic acid, aromatic phosphonates, sulfonic acid ester salts of isophthalic acid, and commercial materials such as bis(4-propylbenzylidene) propyl sorbitol, available as Millad®NX88 from Milliken Chemicals and 3,4-Dimethylbenzylidene sorbitol, available as Millad®3988, phosphate salts and esters, available as NA-11, methylen-bis(4,6-di-t-butylphenyl)phosphate sodium salt, or NA-21, aluminium-hydroxy-bis[2,2"-methylene-bis(4,6-di-t-butyl-phenyl)-phosphate. High melting waxes include materials such as stearamides and erucamides, or bis-amides. Polymers can include materials such as ionomers e.g. Surlyn ionomers from Du Pont, or Aculyn ionomers from Rohm and Haas, PEG2000 (polyethylene glycol), PET, PBT or others. Nucleating agents may also be used in the crystallization of polymers in different situations. Polymer crystallization can be conducted for a number of reasons, each of which would then be performed under different conditions. For example, to create a semi-crystalline part in an injection molding machine it would be required to have a rapid crystallization of the polymer during cooling from the melt. On the other hand, for crystallization of material prior to drying of reclaimed scrap, it would be desired to have the polymer crystallize rapidly from the glassy state, or on the up-heat.

It has been found that it is very advantageous to treat the polycondensate thus obtained to a pelletizing step, such that solid particles are obtained. Thereto, the melt may be passed through a die yielding strands which are cooled in water and that are cut into small particles. Such particles are typically of uniform size and cylindrical in shape. The melt may also be subjected to a process known as "under water pelletization" or "die face cutting", wherein the melt is passed through a die, with a multitude of holes, which is in contact on one side with a cooling medium, such as water, and a rotating hub of cutters is used to cut the emerging melt to form pellets. Such particles are typically of uniform size and nearly spherical. Other methods can also be used. As an example, solid chips of polycondensate may be ground to small particles. The particles are suitably such that the average number of particles per gram is in the range of 40 to 350 particles per gram. Typically such a particle size boils down to polyester particles with a mass of 2.8 to 28 mg.

It has surprisingly been found that the solid state polymerization proceeds at a higher rate with the starting polyesters that are used in the process of this invention. In particular, starting polyesters which are outside of the subject of this invention have been found to undergo solid state polymerization at a reasonably rate when the particle size is very small, but to have very slow solid state polymerization for particle sizes which are greater than about 2 mg, or fewer than 500 particles per gram. This being the case, it allows the skilled person to select the most feasible particle size of the polyester in order to subject it to solid state polymerization. Suitably, the particle size is selected such that there are 40 to 350 particles per gram. Typically such a particle size boils down to polyester particles with a mass of 2.8 to 28 mg. Such particles can easily be prepared directly from the polycondensate and still provide a good polymerization rate when they are subjected to solid state polymerization. Such particles are suitable for pneumatic conveyance, can been conveniently dried with gas flow, and can be suitably melted in typical polymer extrusion equipment, without undue risks due to, for example, excessive dust. The heat treatment at a temperature of 90 to 160° C. that has been described above is preferably conducted with the particles of the polycondensate.

When starting polyesters are subjected to the process of the invention it is possible to obtain lift rates, determined as the increase in IV in dL/g per hour, of greater than 0.0040 dL/g·hr, and more preferably greater than 0.0080 dL/g·hr.

The semi-crystalline starting polyester in the process according to the present invention is brought to a temperature in the range of (Tm-40° C.) to Tm. Suitably the polyester is heated at a temperature in the range of (Tm-40° C.) to Tm for a period of at most 120 hr, preferably from 2 to 60 hr. This represents a significant reduction in time compared to the exemplified solid state polymerizations in WO 2010/077133 and WO 2013/062408. The solid state temperatures that are applied in the process according to the present invention are also higher than those applied in US 2009/0124763. Whereas the temperatures of the solid state polymerizations according to US 2009/0124763 are in the range of 140 to 180° C., the ranges of (Tm-40° C.) to Tm in the process according to the invention will mean that the semi-crystalline starting polyester is suitably heated to a temperature in the range of 180 to 220° C., more preferably from 185 to 210° C. to obtain the solid stated polyester. As indicated above, the values for Tm are preferably from 200 to 220° C., and may even be as high as 245° C.

The solid stating is suitably carried out at atmospheric pressure in the presence of an inert gas flow, in particular nitrogen, argon, helium or neon. Alternatively, the solid stating may be conducted at pressures below atmospheric, e.g. at pressures below 100 mbar, more preferably below 20 mbar.

Reactors, equipment, and controls for the solid state polymerization of poly(ethylene terephthalate) such as described in the book Modern Polyesters: Chemistry and Technology of Polyesters and Copolyesters by J. Scheirs and T. E. Long (eds.), Wiley, 2003, can also be used to advantage for the solid state polymerization of the present invention. When conducted in an atmospheric pressure process with inert gas flow the inert gas is preferably subjected to a gas cleaning step after it has passed through the particles, in order to be efficiently recycled. Applicants have found that the solid state polymerization can slow to unacceptable rates at very long times, and in such cases, if the desired final IV has not yet been obtained then it can be helpful to stop the process, subject the resin to extrusion and pelletizing, then begin the crystallization and solid state polymerization anew.

The invention will be further illustrated by means of the following examples.

Example 1

In a first series of experiments, a polyester was used that was prepared from the dimethyl ester of FDCA with a large excess of ethylene glycol compared to the diester of FDCA, to prepare a purified bis(2-hydroxyethyl)-2,5-furandicarboxylate. This was subjected to polycondensation in the presence of 300 ppm of antimony as a polycondensation catalyst, yielding a poly(ethylene-2,5-furan dicarboxylate) with a number average molecular weight (Mn) of about 15,000, corresponding with an IV of 0.42 dl/g. The amount of carboxylic acid end groups (CEG) the polyester was assessed to be less than 10 meq/kg and the amount of hydroxyl end groups (HEG) was assessed at >160 meq/kg. The relative content, expressed as CEG/(CEG+HEG) was less than 0.06. The polyester was divided in fractions of different particle size ranges. The fractions were subjected to solid state polymerization at a temperature of about 200° C. for a period of up to 8 hours. For each fraction the Mn was determined during the polymerization and an equivalent IV was determined using the equation IV (dL/g)=1.62* $10^{-4}*Mn^{0.820}$. The results are shown in Table 1.

In a second series of experiments a poly(ethylene-2,5-furan dicarboxylate) prepared from MEG and FDCA having an Mn of about 17,000, corresponding with an IV of about 0.49 dL/g, was subjected to solid state polymerization under the same conditions as applied in the first series of experiments, including a solid state polymerization temperature of 200° C. Also in this case fractions of different particle sizes were used. The polyester had an amount of CEG of 66 meq/kg and an assessed amount of HEG of 87 meq/kg. The relative content, expressed as CEG/(CEG+HEG) was about 0.43. The results are also shown in Table 2.

TABLE 1

Polyester with CEG of less than 10 Mn and IV of fractions after solid state polymerization

| | Fractions, mm | | | | | |
|---|---|---|---|---|---|---|
| | 0.6-1.4 | | 0.3-0.4 | | 0.1-0.2 | |
| Time, hr | Mn | IV | Mn | IV | Mn | IV |
| 0 | 14,700 | 0.423 | 14,700 | 0.423 | 14,700 | 0.423 |
| 2 | 16,500 | 0.465 | 21,500 | 0.578 | 22,400 | 0.598 |
| 8 | 18,500 | 0.511 | 25,200 | 0.659 | 29,400 | 0.747 |

TABLE 2

Polyester with CEG of 66 meq/kg, Mn and IV of fractions after solid state polymerization

| | Fractions, mm | | | | | |
|---|---|---|---|---|---|---|
| | 0.6-1.4 | | 0.3-0.4 | | 0.1-0.2 | |
| Time, hr | Mn | IV | Mn | IV | Mn | IV |
| 0 | 17,500 | 0.488 | 17,500 | 0.488 | 17,500 | 0.488 |
| 2 | 19,800 | 0.540 | 22,400 | 0.598 | 23,100 | 0.613 |
| 8 | 30,500 | 0.770 | 30,700 | 0.774 | 30,400 | 0.768 |

From a comparison between the results of Tables 1 and 2 it is apparent that although the solid state polymerization rates are similar for the very smallest particles (0.1-0.2 mm fraction), when the particle size is increased the solid state polymerization rate of the polyester with CEG/(CEG+HEG) of 0.43 and CEG of 66 meq/kg performs far better than the comparative polyester. For reference, a spherical pellet with 1 mm diameter would have a weight of 0.75 mg, or contain 1300 particles/gram.

Example 2

Ethylene glycol (MEG) and 2,5-furandicarboxylic acid (FDCA) were mixed in an MEG:FDCA molar ratio of 1.12 along with $Sb_2O_3$ as a catalyst, present at 314 ppm of antimony. The reaction mixture further contained 80 ppm (0.09 mmol/mol) of tetraethylammoniumhydroxide (TEAOH). The mixture was subjected to esterification without addition of an esterification catalyst for a period of time ($t_e$) at elevated temperature. Water that was formed was evaporated and passed into a distillation column. The condensed water was removed and any MEG that was entrained or evaporated was recycled back to the reaction mixture. The reaction was continued at atmospheric pressure until 80% of the theoretical water, based on furandicarboxylic acid feed, was collected. The temperature at that time was 214° C. and the reaction time was 175 minutes. The pressure was reduced, and prepolycondensation was started, the pressure reaching 20 mbar in approximately 80 minutes. The vacuum take-off point was switched at this point so that any additional ethylene glycol could be removed without passing through the distillation column. The pressure was further reduced to below 5 mbar. The ester composition with the catalyst was subjected to a polycondensation at a temperature of 261° C. for 150 minutes. The intrinsic viscosity (IV) was about 0.61 dL/g. The relative CEG was determined as CEG/(CEG+HEG). The acetaldehyde content was well above 15 ppm. The reaction conditions and the results are shown in Table 3.

TABLE 3

| Esterification | | | | Polycondens. | | | | rel. | HEG, | CEG, |
|---|---|---|---|---|---|---|---|---|---|---|
| MEG/FDCA | T, ° C. | $t_e$, min | EsPo | T, ° C. | $T_p$, min | IV, dL/g | P rate | CEG | meq/kg | meq/kg |
| 1.12 | 214 | 175 | 0.29 | 261 | 150 | 0.61 | 4.06 | 0.30 | 59 | 25 |

The polycondensate above, having an IV of 0.61 dL/g, a relative CEG ratio of 0.30, and an absolute CEG content of 25 meq/kg, was crystallized by increasing its temperature to 125° C. and holding for about 1 hour, after which the material was cooled and any agglomerates were broken up. The material was then heated to 170° C. and held for about 3 hrs, followed by a temperature ramp to 195° C. (at a rate of 12.5° C./hr) and holding for about 12 hours. The material thus obtained exhibited a peak melting point of 204° C. and a crystallinity of 50 J/g as determined by DSC. The material was loaded into a rotary vacuum tumble dryer and subjected to solid state polymerization by heating under vacuum to 190-195° C. The chips were sampled periodically, with the results shown in Table 4 below. In the Table the intrinsic viscosity (IV), the peak melting point (T peak) and the crystallinity (dHm) are shown at loading into the tumble dryer and after 13 and 50 hours in the tumble dryer, respectively. The Table further shows the rate of the increase of the IV, expressed in dL/g·hr (also known as the lift rate).

TABLE 4

| Time (hrs) | IV, dL/g | Lift rate (from t = 0 hrs) dL/g · hr | T peak, ° C. | dHm, J/g |
|---|---|---|---|---|
| 0 | 0.56 | | 204 | 50 |
| 13 | 0.67 | 0.0085 | 209 | 58 |
| 50 | 0.79 | 0.0046 | 217 | 66 |

The experiment shows that the heat treatment in the solid state results in an increased molecular weight, as shown by the increase in intrinsic viscosity, and in a higher crystallinity as shown by the higher value in the DSC measurement. The pellets had a size in the range of 40-350 pellets/gram. The acetaldehyde content of the polyester after the solid state polymerization had an acetaldehyde content of 0.3 mg/kg (ppm). The diethylene glycol content was 0.044 mole/mole FDCA. The final CEG content was 11 meq/kg, as determined by titration. The decarboxylated end group content was 14 meq/kg, as determined by NMR.

Comparative Experiment 1

An furandicarboxylate-based polymer was prepared starting from a starting mixture comprising the dimethylester of FDCA and ethylene glycol in a molar ratio of 1:2.0 in the presence of 120 ppm of zinc (added as acetate) as a transesterification catalyst and 300 ppm of antimony (added as glycolate) for the esterification. This experiment is according to the teachings of WO 2013/120989. During the transesterification methanol formed was removed and any evaporated ethylene glycol was recycled to the reaction mixture. The transesterification continued for 2 hours at a maximum of 210° C. The mixture obtained after 2 hrs was subjected to a pressure reduction and prepolycondensation at 390 to 530 mbar and a temperature of 210° C. for 2 hrs, and subsequently to polycondensation at a pressure of less than 2 mbar and a temperature of 240° C. for 4 hrs. After melt polymerization the material had an IV of 0.33 dL/g, a relative CEG ratio of less than 0.05, and an absolute CEG content of 9 meq/kg. The methyl ester content was 13 meq/kg. The HEG content was greater than 200 meq/kg. The acetaldehyde content was well above 15 ppm. It appeared that the process took over 8 hours to obtain a relatively low molecular weight polyester.

The material was sieved to remove the dust and long particles, as significant dust was present. The material was then heated in a rotary vacuum drum dryer, to dry, crystallize, and solid state the chips. Table 5 below shows the progress. The material was heated to 180-195° C., but agglomeration was significant and the material needed to be frequently discharged to break up agglomerates.

TABLE 5

| Time (hrs) | IV, dL/g | Lift rate (from t = 0 hrs) dL/g · hr | T peak, ° C. | dHm, J/g |
|---|---|---|---|---|
| 0 | 0.33 | | 211 | 41 |
| 142 | — | | 211 | 55 |
| 330 | 0.49 | 0.0005 | 217 | 78 |
| 400 | 0.52 | 0.0005 | 220 | 74 |
| 570 | 0.61 | 0.0005 | 229 | 86 |
| 828 | 0.68 | 0.0004 | 228 | 87 |
| 972 | 0.76 | 0.0004 | 231 | 87 |

Table 5 shows that the polyesters that do not have the desired amount of carboxylic acid end groups can only be polymerized to the desired molecular weight by exposing the polyester to solid state conditions for a very long time and exhibit a very low lift rate. The pellets had a size in the range of 40-350 pellets/gram. It was not until after 972 hours that the acetaldehyde content was measured to be 0.5 ppm and the final CEG content was 3 meq/kg.

The invention claimed is:

1. A process for enhancing the molecular weight of a semi-crystalline starting polyester comprising ethylene 2,5-furandicarboxylate units, by heating the semi-crystalline starting polyester, having a melting point Tm, at a temperature in the range of (Tm-40° C.) to Tm to obtain a solid stated polyester, wherein the semi-crystalline starting polyester has an intrinsic viscosity of at least 0.45 dL/g, and an amount of carboxylic acid end groups in the range of 15 to 122 meq/kg.

2. The process according to claim 1, wherein the semi-crystalline starting polyester has a crystallinity of at least 25 J/g, measured by Differential Scanning Calorimetry (DSC).

3. The process according to claim 2, wherein the semi-crystalline starting polyester has a maximum crystallinity of at most 80 J/g, measured by Differential Scanning Calorimetry (DSC).

4. The process according to claim 1, wherein semi-crystalline starting polyester has a Tm of at least 200° C., as measured by Differential Scanning Calorimetry (DSC).

5. The process according to claim 1, wherein the semi-crystalline starting polyester has an intrinsic viscosity in the range of 0.45 to 0.75 dL/g.

6. The process according to claim 1, wherein the semi-crystalline starting polyester has been allowed to crystallize by having been kept at a temperature in the range of 90 to 200° C. before being heated to a temperature of at least (Tm-40° C.).

7. The process according to claim 6, wherein the semi-crystalline starting polyester has been kept at a temperature in the range of 90 to 200° C. for a period of 2 to 48 hr.

8. The process according to claim 1, wherein the semi-crystalline starting polyester having an amount of hydroxyl end groups in addition to carboxylic acid end groups, has a content of carboxylic acid end groups, expressed as the fraction of the molar amount of carboxylic acid end groups divided by the sum of the molar amounts of hydroxyl end groups and carboxylic acid end groups, in the range of 0.10 to 0.7.

9. The process according to claim 8, wherein the content of carboxylic acid end groups, expressed as the fraction of the molar amount of carboxylic acid end groups divided by the sum of the molar amounts of hydroxyl end groups and carboxylic acid end groups is in the range of 0.14 to 0.65.

10. The process according to claim 1, wherein the semi-crystalline starting polyester is contained in a composition that further comprises one or more esterification and/or polycondensation catalysts.

11. The process according to claim 10, wherein the esterification and/or polycondensation catalysts have been selected from the esterification and polycondensation catalysts comprising a metal selected form the group consisting of titanium, tin, zinc, calcium, antimony, germanium, manganese, cobalt, lead, magnesium, aluminium, cerium, zirconium and hafnium.

12. The process according to claim 1, wherein the semi-crystalline starting polyester is in the form of pellets having a mass of 2.8 to 28 mg.

13. The process according to claim 1, wherein the semi-crystalline starting polyester is in the form of pellets having a particle size selected such that there are 40 to 350 particles per gram.

14. The process according to claim 1, wherein the semi-crystalline starting polyester is heated at a temperature in the range of (Tm-40° C.) to Tm for a period of at most 120 hr.

15. The process according to claim 1, wherein the semi-crystalline starting polyester is heated to a temperature in the range of 180 to 220° C. to obtain the solid stated polyester.

16. A polyester comprising ethylene-2,5-furandicarboxylate units, which polyester has an IV of at least 0.75 dL/g and an acetaldehyde content of at most 1 mg/kg.

17. The polyester according to claim 16, which has an amount of carboxylic acid end groups in the range of 5 to 30 meq/kg.

18. The polyester according to claim 16, which has a crystallinity of at least 40 J/g, measured by Differential Scanning Calorimetry (DSC).

19. The process according to claim 14, wherein the semi-crystalline starting polyester is heated at a temperature in the range of (Tm-40° C.) to Tm for a period of from 2 to 60 hr.

20. The polyester according to claim 16, which polyester has an acetaldehyde content of less than 0.5 mg/kg.

* * * * *